Sept. 7, 1965  W. WELKOWITZ  3,204,456
ULTRASONIC FLOWMETER
Filed Sept. 28, 1961  5 Sheets-Sheet 1
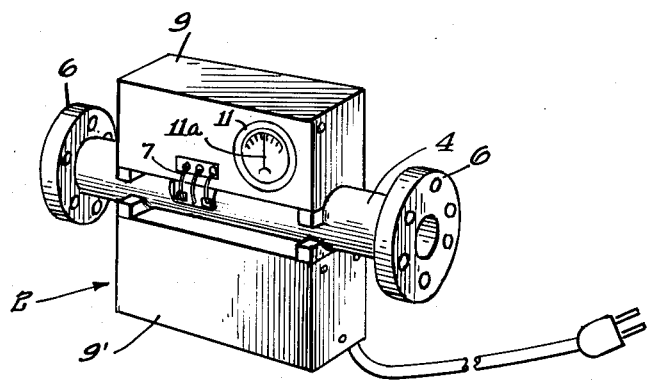
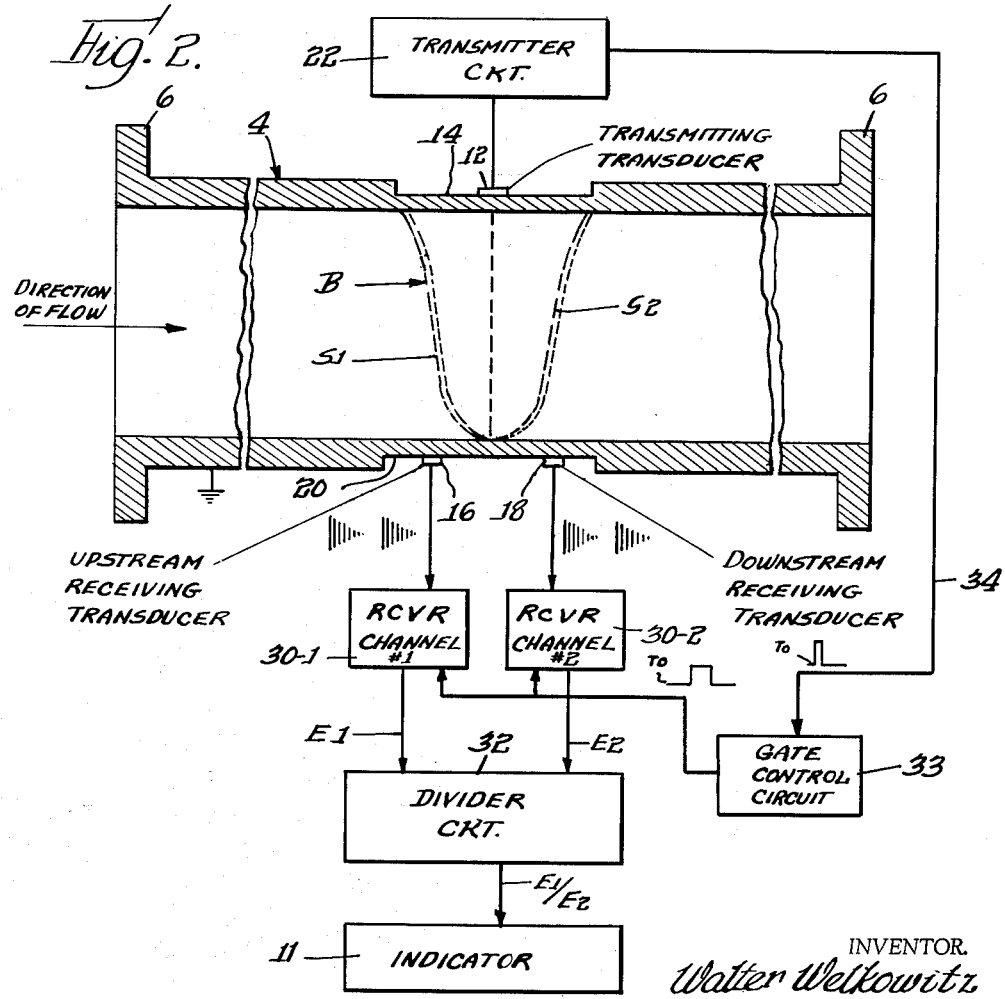
INVENTOR.
Walter Welkowitz
BY
Wallenstein, Spangenberg et al.
Attys.

Sept. 7, 1965  W. WELKOWITZ  3,204,456
ULTRASONIC FLOWMETER
Filed Sept. 28, 1961  5 Sheets-Sheet 2

INVENTOR.
Walter Welkowitz

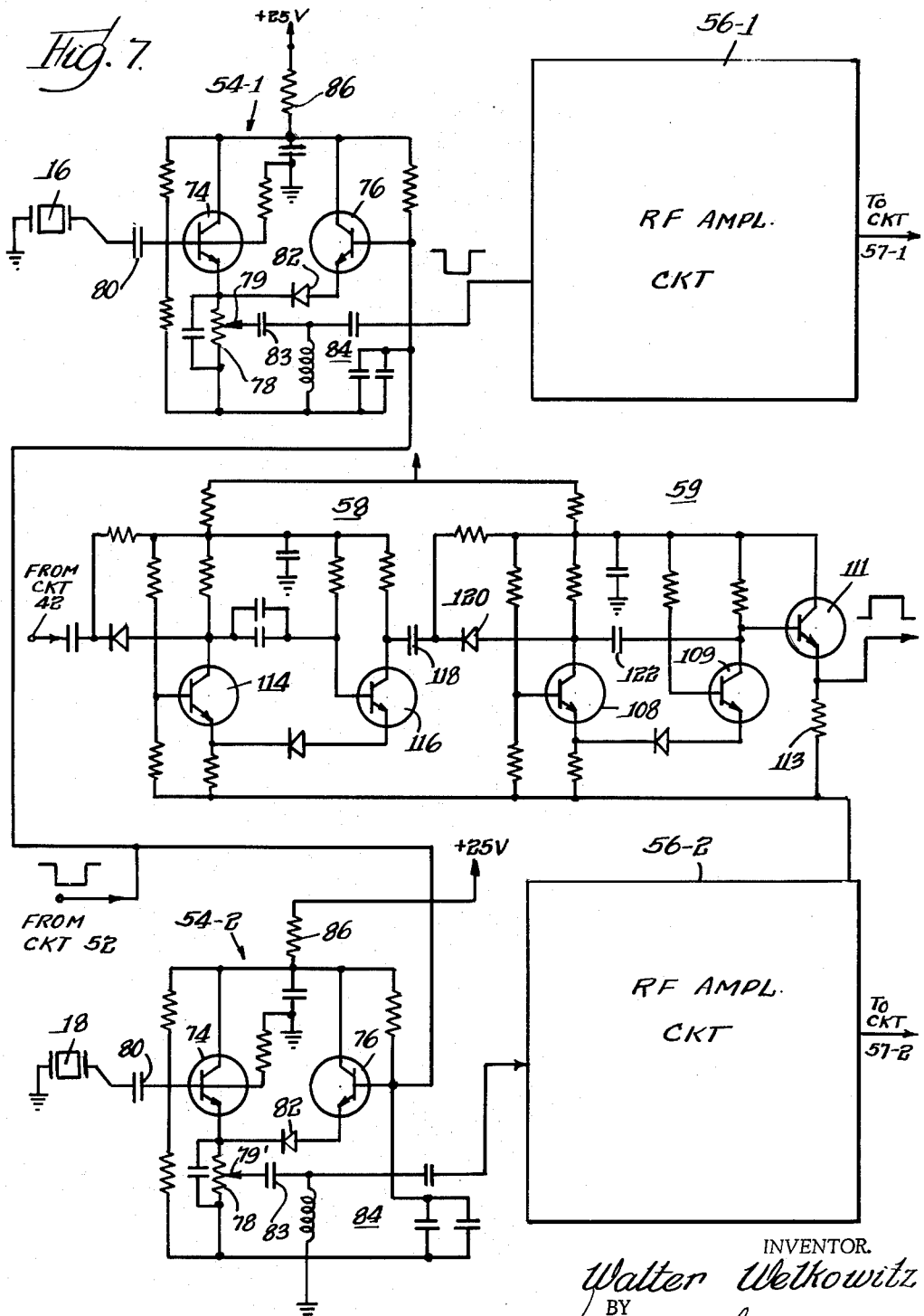

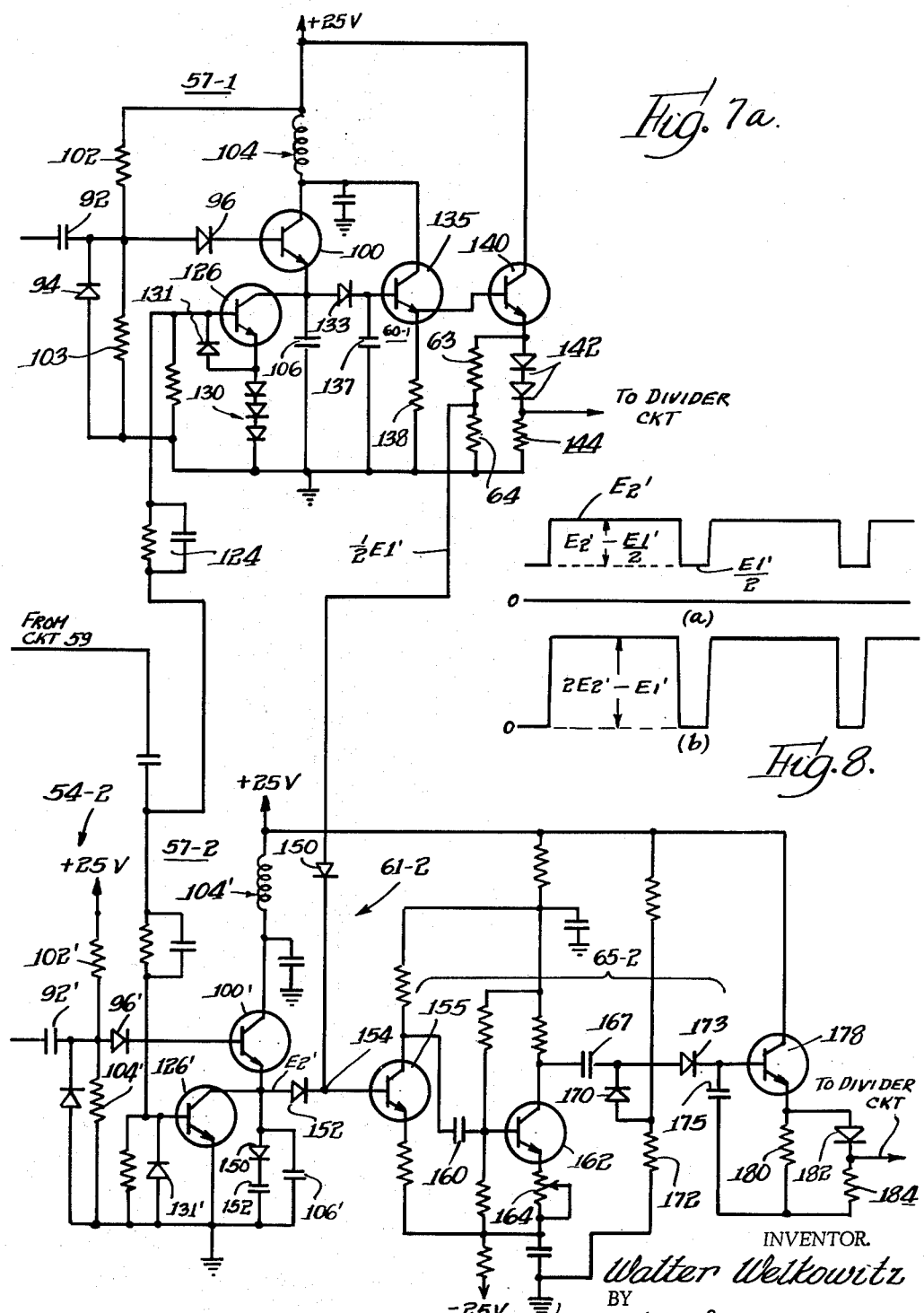

3,204,456
ULTRASONIC FLOWMETER
Walter Welkowitz, Nixon, N.J., assignor to Gulton Industries, Inc., Metuchen, N.J., a corporation of New Jersey
Filed Sept. 28, 1961, Ser. No. 141,505
6 Claims. (Cl. 73—194)

This invention relates to ultrasonic flowmeters of the beam deflection type.

In recent years a new form of flowmeter has been proposed operating on the deflection of an ultrasonic beam directed across a conduit carrying the fluid involved by the movement of the fluid in the conduit. The degree of deflection of the beam provides a measure of the rate of flow of the fluid. All of the signal transmitting and receiving components are located on the outside of the conduit involved, so that no flow restrictions or corrosion problems are involved. A piezo-electric transmitting transducer is mounted on the outside of a section of pipe carrying the fluid to be measured, and a pair of longitudinally spaced piezo-electric receiving transducer elements are mounted on the outside of the pipe a substantial distance downstream from the transmitting transducer element, the wall thickness at the point of attachment of the transducers thereto being a multiple of a half wave length at the frequency of the ultrasonic waves to be generated. The transmitting transducer provides a directive beam pattern which, in one proposed form of the flowmeter, makes a substantial angle with a transverse line so that the beam is transmitted at an angle downstream where it is reflected off the pipe walls several times before reaching the receiving transducer elements. The outputs of the receiving transducer elements are directly or indirectly differentially connected so that a measurement is obtained of the difference of the amplitudes of the ultrasonic signals intercepted by the receiving transducer elements, which measurement indicates the fluid flow rate. Under no flow conditions the measurement is zero because the receiving transducers intercept similar signals. Under flow conditions a finite differential measurement is obtained due to the deflection of the beam downstream which causes different ultrasonic signals to impinge upon the receiving transducer elements. The accuracy of this flowmeter depends upon the maintenance of a fixed amplitude of the transmitted ultrasonic signal and a constant absorption characteristic of the fluid. This requirement is difficult and under many circumstances impractical to satisfy. Variations in voltage conditions in the transmitter circuit feeding the transmitting transducer element and variation in the liquid being measured will, of course, prevent the maintenance of the aforesaid conditions.

A significant improvement in the design of beam deflection type flowmeters has been made by an invention of Dr. Heinz E. Kallmann wherein the measurement results do not vary with the amplitude of the transmitted ultrasonic signal or the absorption characteristics of the fluid medium being measured. This invention is disclosed and claimed in copending application Serial No. 141,180, filed September 27, 1961, entitled "Ultrasonic Flowmeter." The invention involves the positioning of the receiving transducers to intercept oppositely substantially linearly sloping signal drop-off segments of the transmitted ultrasonic beam over the range of flow rates to be measured and dividing (rather than subtracting) the outputs of the receiving transducer elements.

In the practice of my invention, the transmitting transducer, which is designed to transmit a symmetrical beam pattern having oppositely linearly sloping signal drop-off segments on opposite sides of a maximum response point, is mounted so as to direct the beam pattern substantially at right angles to the longitudinal axis of the conduit. This transverse directivity of the transmitted ultrasonic beam was previously proposed by myself and Hugo E. Dahlke in connection with the flowmeter inventions disclosed and claimed in copending application Serial Nos. 707,744 and 11,814 respectively filed January 8, 1958 and February 29, 1960. In both applications a receiving transducer element is mounted slightly upstream from the transmitting transducer where the received signal varies substantially and in an almost linear manner with the flow rate. The latter of the applications adds a second receiving transducer element directly across from the transmitting transducer where the received signal varies only slightly with fluid flow. The output of the two receiving transducer elements is subtracted and the effect of the second receiving transducer element is to provide a measurement which is independent of the absorption characteristics of the fluid.

It has been discovered that undesired standing waves which are sometimes set up by continuous wave ultrasonic signals are avoided by using pulsed ultrasonic signals. (This feature is disclosed and claimed in said application Serial No. 707,744.) With the arrangement of the receiving transducer elements just described, the receiving transducer elements are positioned to intercept directly the transversely transmitted ultrasonic signal. Each transmitted ultrasonic pulsation also rebounds back and forth off the walls of the conduit so that the receiving transducer elements will receive not only an initial directly received ultrasonic pulsation but also echo pulsations whose amplitudes decay at each reflection. The pulse repetition rate of the transmitted ultrasonic pulsations is adjusted so that the echo pulsations resulting from a given transmitted ultrasonic pulsation substantially disappear before the transmission of the next ultrasonic pulsation. The outputs of the receiving transducer elements in beam deflection type ultrasonic flowmeters are usually amplified, rectified and filtered by receiver channels connected thereto, to provide direct current signals whose amplitudes are a function of the average amplitude of the ultrasonic signals received by the receiving transducer elements. The aforesaid division operation involves the division of the direct current voltages derived from the outputs of the receiving transducer elements. In the case where echo pulsations are received by the receiving transducer elements, the amplified, rectified and filtered direct current voltages referred to represent an average of the initially received pulsations as well as the echo pulsations. For some purposes, the contribution of the echo pulsations to the output direct current voltages is desirable since they they contributed to the sensitivity of the flowmeter system. It has been discovered that for many flowmeter applications the integration or averaging of the initially transmitted ultrasonic pulsation with the echo pulsations creates instabilities in the flowmeter measuring system and that substantial improvement in stability is achieved by removing from the receiver channels all but one (and the same) ultrasonic pulsation received by the receiving transducers each transmission cycle. It is preferred that the directly received pulsations or the first echo pulsations be the pulsations which are rectified and filtered by the receiver channels. In accordance with the most preferred form of this aspect of the invention, the receiver channels are rendered sensitive to the outputs of the receiving crystals for only a short interval between the transmission of successive ultrasonic pulsations, which interval starts a short time before the first (or second) pulsation reaches the receiving transducer elements and terminates a short time after the transmitted pulsation is received (which is prior to the reception of the next echo pulsation).

Other features and advantages of the present invention will become apparent upon making reference to the specification to follow, the claims and the drawings wherein:

FIG. 1 is a perspective view of the physical components making up a beam deflection type flowmeter which incorporates features of the present invention;

FIG. 2 is an enlarged sectional view through the pipe or conduit portion of the flowmeter shown in FIG. 1 showing the relationship of the transmitting and receiving transducers and includes a box diagram of the basic circuit components utilized with the transducer elements in the application of the present invention;

FIGS. 7 and 7A is a diagram of a portion of the circuit shown in FIG. 6; and

FIG. 8 is a diagram illustrating the operation of the subtraction circuit disclosed in FIG. 7.

Figure 3:
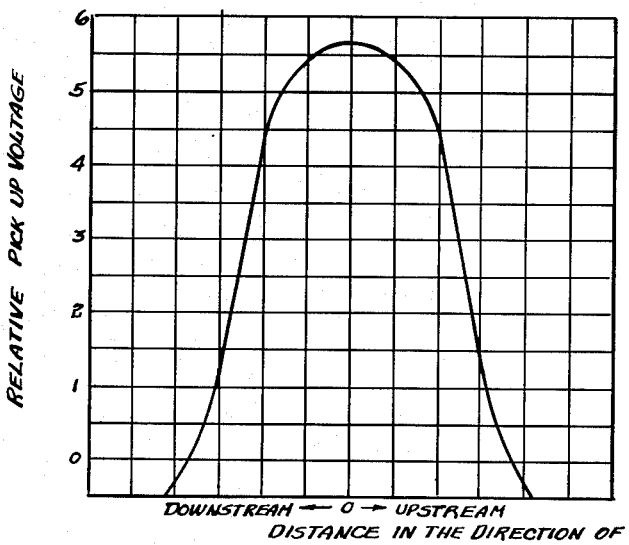
FIG. 3 is a curve illustrating the beam pattern of the transmitted pulse in terms of the relative signal strengths intercepted at different points along the pipe on which the transmitting and receiving transducers are mounted under no flow conditions.

Referring now to FIG. 1, the beam deflection type flowmeter there shown is an integral unit 2 designed to be connected between two pipe sections in a pipe system carrying the fluid to be measured. The flowmeter unit 2 includes a pipe section 4 having flanges 6—6 at the ends thereof with bolt or screw-receiving holes therein for connecting the same to similarly flanged portions of a pair of pipes (not shown). The aforementioned transmitting and receiving transducers are adhesively or otherwise secured to the outside of the conduit 4, and connecting wires 7 extend from these transducer elements to electrical transmitting and receiving circuitry contained in upper and lower housing sections 9 and 9' between which the pipe section 4 extends. The transmitting and receiving circuitry could be located at a point remote from the pipe section 4, but for most purposes it is convenient to make the flow measuring apparatus as an integral unit. The upper housing section 9 includes a direct current meter 11 having a pointer 11a which normally assumes a centered zero position under no flow conditions, and is deflected to the right of this position to a degree dependent on the flow rate when fluid flows through the pipe section 4 in one direction, and to the left of this position to a degree dependent on the flow rate when the fluid flows through the pipe section in the opposite direction.

Reference should now be made to FIG. 2 which illustrates the invention involved. The transmitting transducer, which is indicated by reference numeral 12, comprises a piezo-electric crystal of quartz, barium titanate, lead-zirconate titanate or the like. In one instance, the crystal was a thin square plate one-half inch wide. The transmitting crystal 12 is mounted on a machined flat portion 14 of the pipe section which is parallel to the longitudinal axis thereof. The pipe section at this point preferably has a wall thickness which is a multiple of half wave lengths at the frequency of the ultrasonic waves to be transmitted therethrough. The thin transmitting crystal is mounted in face-to-face contact with the flat pipe portion 14 to direct an ultrasonic beam B at right angles to the longitudinal axis of the pipe section, which is in distinction to the inclination of the transmitted beam in the originally proposed flowmeter system outlined above.

A transmitter circuit 22 is provided for energizing the transmitting crystal 12 at an ultrasonic frequency, such as one megacycle (one million cycles per second). The transmitter circuit 22 preferably intermittently energizes the transmitting crystal resulting in pulsations of ultrasonic energy passing through the walls of the pipe section and into the fluid therein. Because of the substantially transverse direction of the transmitted signals, echoes of these pulsations will be received by the receiving crystals. The echo pulsations diminish in magnitude with time until they substantially disappear. The pulse repetition rate of the transmitter circuit is selected so that the echoes from a given transmitted ultrasonic pulsation substantially decay to zero before the transmission of the next transmitted pulsation.

The transmitting crystal 12 generates a directive beam having oppositely sloping segments S1 and S2 which are substantially linear. The receiving crystals 16 and 18 are positioned to intercept the substantially linear segments S1 and S2 of the beam over the range of flow rates to be measured. The receiving crystals 16 and 18 which may be thin plates of piezo-electric material like the transmitting crystal (only preferably narrower in the direction of the pipe axis) are mounted on a machined flat portion 20 on the pipe section 4 at a point diametrically opposite the point at which the transmiting crystal is mounted. The flat portion 20 is parallel to the longitudinal axis of the pipe section 4 and forms a wall having a thickness which is a multiple of half wave lengths at the frequency involved. The receiving crystals 16 and 18 are positioned respectively upstream and downstream the same distance from the transmitting crystal 12. Under no flow conditions, the receiving crystals are positioned equidistant from the beam axis to intercept the center points of the linear segments of the transmitted ultrasonic beam where both crystals receive signals of the same intensity. Since the transmitted ultrasonic beam is directed transversely of the pipe axis, and the beam is symmetrical with respect to the axis of the beam, longitudinal movement of the beam by the movement of fluid in the pipe section 4 will result in an increase in the signal amplitude intercepted by the downstream receiving crystal and a similar decrease in the signal amplitude intercepted by the upstream receiving crystal provided the linear segments of the beam remain opposite the receiving crystals. This similar increase and decrease of the signals received by the latter crystals upon movement of fluid through the pipe section is not obtained when the transmitted beam is directed at an angle to a transverse line, and a loss of sensitivity in such case results when the outputs of the receiving crystals are divided in accordance with the present invention.

The degree of beam deflection obtained varies with the inner diameter of the pipe section 4 and the flow velocity. Small deflections, such as 0.021 inch and under are readily detected by the receiving crystals.

The outputs of the receiving crystals are respectively fed to separate receiver channels 30–1 and 30–2 which amplify, rectify and filter the resultant output to provide direct current output voltages E1 and E2 which are respectively proportional to the magnitudes of the ultrasonic signals received by the receiving crystals 16 and 18.

As previously indicated, the direct current outputs of the receiver channels 30–1 and 30–2 are fed to a suitable divider circuit 32 which provides at the output thereof a voltage which is a measure of the ratio of the two voltages. The divider circuit 32 most advantageously is the divider circuit disclosed in copending application Serial No. 141, 347, filed September 28, 1961, of Leonard Kleinberg entitled "Quotient Circuit," now Patent No. 3,129,-463. In the case where the direction of flow is to the right as viewed in FIG. 2, the Kleinberg divider circuit 32 provides a voltage of a first polarity which is a measure of the flow rate involved. Where the direction of flow is to the left as viewed in FIG. 2, the Kleinberg divider circuit provides a negative voltage which is a measure of the flow rate involved. The direct current output of the divider circuit 32 is fed to a suitable meter or indicator 11 which is capable most advantageously of indicating voltages of both possible polarities. In accordance with the present invention, any suitable divider circuit may be utilized although the Kleinberg type circuit is by far the most advantageous type of divider circuit for the purposes of the present invention.

Figure 6:
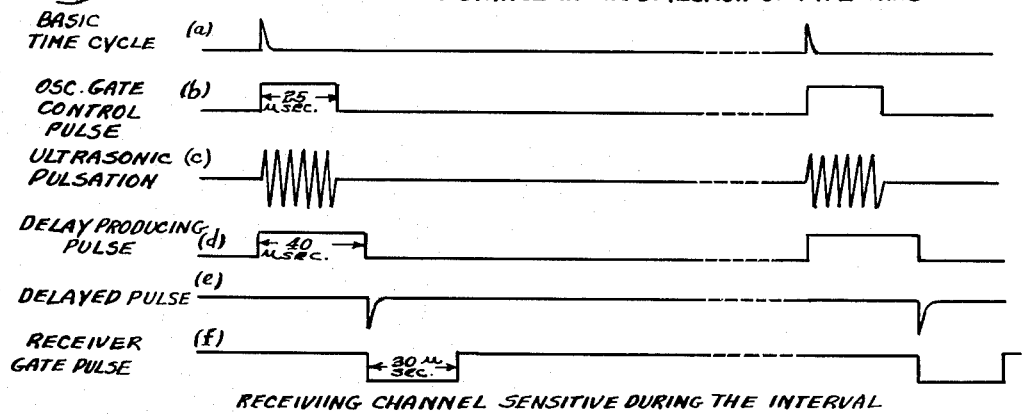
FIG. 6 is a timing diagram illustrating various waveforms present in the circuit of FIG. 5.
Figure 4:
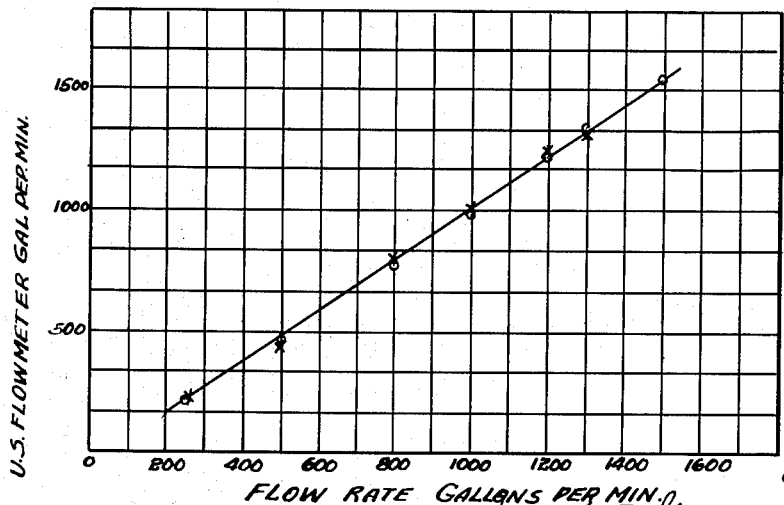
FIG. 4 is a curve showing the linearity and repeatability of the fluid flow measurements using a flowmeter incorporating the features of the present invention.

As previously indicated, in accordance with another aspect of the present invention, all but one of the pulses appearing in the output of the receiving crystals each transmission cycle is gated out of the receiver channels 30–1 and 30–2. Preferably, the pulse to which the receiver channels responds is the directly received ultrasonic beam pulsation or the first echo pulsation. This aspect of the invention is diagrammatically illustrated in FIG. 2 by a gate control circuit 33. The gate control circuit 33 has an input line 34 extending from the output of the transmitter circuit 22. A pulse appears on the line 34 at the instant of each energization of the transmitting crystal, which pulse synchronizes the operation of the gate control circuit. The gate control circuit 33 operates momentarily to open a pair of gates in the receiver channels to allow only the desired received signal pulse each transmission cycle to pass through the receiver channels to the inputs of the divider circuit 32. This will be understood more fully in connection with the timing diagram of FIG. 6 which illustrates various waveforms present in the detailed box diagram of FIG. 5 to which reference is now made.

Figure 5:
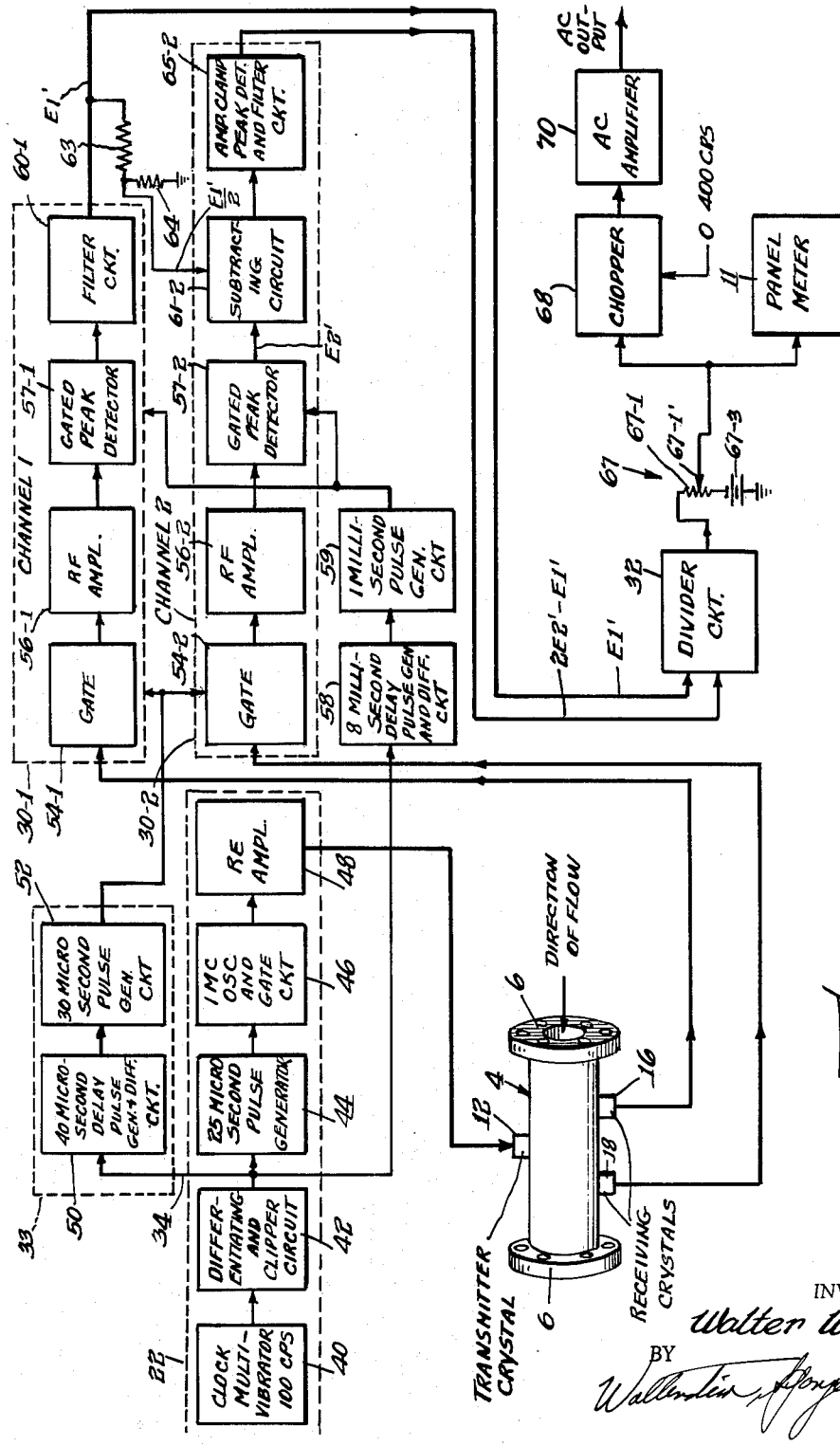
FIG. 5 is a detailed box diagram of the most preferred form of the present invention.

The basic timing unit of the flowmeter system is shown as a multivibrator circuit 40 which, for example, may have a frequency of 100 cycles per second. (The multivibrator 40, the differentiating and clipper circuit 42 as well as most of the circuits shown in box form in FIG. 5 may be conventional well known components each individually performing a well known function to be described. The present invention deals with the novel combination of these old components to perform new and useful results in ultrasonic flowmeters.) The output of the multivibrator circuit 40 is a square waveform which is fed to a differentiating and clipper circuit 42 which differentiates the square wave output of the multivibrator 40 and clips either the resulting positive or negative pulses to produce one narrow pulse at the start of the cycle of the circuit as shown in FIG. 6(a). The output of the differentiating and clipper circuit 42 is fed to a pulse stretching circuit in the form of a one-shot multivibrator circuit which generates a square shaped pulse shown in FIG. 6(b) which is assumed to be 25 micro-seconds in duration. This pulse is utilized to provide a 25 microsecond ultrasonic pulsation shown in FIG. 6(c). The ultrasonic frequency could be 1 megacycle. This pulse can be utilized to energize a 1 megacycle oscillator or, as illustrated in FIG. 5, as a gate control pulse which is fed to an oscillator and gate circuit 46 where the output of a continuously operative 1 megacycle oscillator is passed through a gate opened for 25 micro-seconds to pass the oscillator output to an RF amplifier circuit 48. The output of the amplifier circuit is fed to the transmitting crystal 12 to generate the ultrasonic beam previously described.

The output of the differentiating and clipper circuit 42 which provides one pulse each transmission cycle is fed to a pulse stretching circuit in the form of a pulse delay generator and differentiating circuit 50. This circuit may include a one-shot multivibrator circuit which produces a square shaped pulse shown in FIG. 6(d) having a duration which determines the start of the period where the first received pulsation sensed by the crystals are fed through the receiver channels 30–1 and 30–2. The start of this period depends on the time it takes the transmitted ultrasonic pulsation to reach the receiving crystals. This is a function of the inner diameter of the pipe section and the fluid being measured. If the fluid is water at a temperature below about 85° F. and a pipe section having an inner diameter of two inches, the gating period can start 40 micro-seconds after the transmission of the ultrasonic pulsation. This prevents the reception of undesired noise by the receiving crystals during this 40 micro-second period.

The circuit 50 also includes a differentiating network and an associated clipping means for producing a short pulse (see FIG. 6(e)) at the trailing edge of the 40 microsecond pulse which short pulse is fed to the input of a 30 micro-second pulse generator 52, which may be a one-shot multivibrator which produces a 30 micro-second gate opening pulse shown in FIG. 6(f). This 30 microsecond pulse (which occurs 40 micro-seconds after the start of the transmission cycle involved) is used to open gate circuits 54–1 and 54–2 in the receiver channels 30–1 and 30–2 for 30 micro-seconds. These gate circuits may include transistor switches or the like (shown in FIG. 7) which respectively have inputs extending from the outputs of the upstream and downstream receiving transducers 16 and 18, respectively. When the 30 micro-second pulse is fed to the gate circuits, the circuits are effective to pass the signals then present at the inputs thereof to respective RF amplifier circuits 56–1 and 56–2.

The outputs of the RF amplifier circuits 56–1 and 56–2 are respectively fed to the inputs of gated peak detectors 57–1 and 57–2 to be described. These detector circuits include capacitors (shown in FIG. 7a and to be described) which charge up to the peak values $E1'$ and $E2'$ of the voltages fed thereto from the RF amplifier circuits 56–1 and 56–2. At a later time during the cycle (about 2 milliseconds before the end of the cycle), the capacitors are discharged. A filter circuit 60–1 connected to the output of the peak detector 57–1 provides a direct current potential proportional to the average output of the gated detector 57–1. The ($E1'$) output of the filter circuit is coupled to the input of the divider circuit 32 (FIG. 5). The output of the filter circuit 60–1 is also connected through a divider network comprising resistors 63 and 64 which provides across resistor 64 a direct current voltage proportional to $E1'/2$. This voltage together with the output $E2'$ of the peak detector 57–2 are fed to a subtracting circuit 61–2 which provides at its output a pulsating D.C. or square wave voltage having an upper D.C. voltage level $E2'$ (FIG. 8a) lasting about 8 milliseconds and a lower D.C. voltage level $E1'/2$ lasting for one millisecond. The output of this subtracting circuit is fed to an amplifier, peak detector and filter circuit 65–2 which amplifies the pulsating D.C. output of the subtracting circuit by 2 and clamps the pulsating D.C. to ground so that an 8 millisecond D.C. voltage pulse having the value $2(E2'-\frac{1}{2}E1')$ or $2E2'-E1'$ (FIG. 8b) is provided. This pulse is filtered and fed to the other input of the divider circuit 32.

The provision of a D.C. voltage proportional to $2E2'-E1'$ is utilized when the Kleinberg divider circuit disclosed in the aforesaid Kleinberg patent is utilized. When voltages proportional to $E1'$ and $2E2'-E1'$ are fed to the two inputs of this circuit, the output of the divider circuit is a D.C. output $E1'/2E2'$. This circuit operates on the principle that the average value of a square wave having two levels of the same polarity (or one of which is ground potential) indicates the ratio of the voltage $E1'$ to the voltage $2E2'$ when the higher level of the square wave has a duration proportional to the value $E1'$ and the lower level of the square wave has a duration proportional to the difference between $2E2'$ and $E1'$. If the lower level were proportional to $E2'-E1'$ instead of $2E2'-E1'$, when the voltages $E1'$ and $E2'$ are of comparable values, the duration of the lower level is so short as to make the circuit impractical since the square wave generator circuit involved would have to operate at the lower level for an insignificant period of time. The generation of the $2E2'$ voltage provides a square wave with equal duration for the upper and lower levels when $E2'$ and $E1'$ are equal.

The flowmeter of the invention produces two voltages of comparable magnitudes during no flow conditions ($E2'$ and $E1'$ derived from the receiving crystals) so that the use of the Kleinberg type circuit requires the generation of a voltage $2E2'$ or similar quantity to ensure the substantially unequal values of the voltages fed to the divider circuit under these conditions.

In accordance with the broadest aspects of the present invention, any arrangement which provides a D.C. output voltage proportional to the ratio of $E1'$ and $E2'$ is satisfactory although the Kleinberg type circuit is decidedly preferred.

The timing of the discharge of the capacitors in the peak detector circuit and the subtraction operation of the subtraction circuit each transmission cycle is accomplished by timing circuits 58 and 59. The timing circuit 58 is an 8 millisecond delay pulse generator and differentiating circuit receiving its input from the output of the differentiating and clipper circuit 42 which provides a pulse at the start of each transmision cycle. The timing circuit 58 is a circuit similar to the circuit 50 previously described and provides a square pulse having an 8 millisecond duration. (In the example of the invention being described, the period between the generation of successive ultrasonic pulsations is 10 milliseconds.) This pulse is differentiated to provide short pulses at the leading and trailing edges of the square top pulse. One of these pulses is clipped by a clipper circuit forming part of the circuit 58 to leave the pulse at the trailing edge of the 8 millisecond pulse. This pulse is fed to a one millisecond pulse generator 59 which is similar to the one-shot multivibrator pulse generator 52. The pulse generator 59 produces a one millisecond square top pulse which is utilized to discharge the capacitors of the peak detector circuits 57-1 and 57-2 to be described and operate the subtraction circuit.

When the receiving crystals have outputs which are identical in amplitude indicating a no flow condition, it is desirable to provide zero deflection of the flow indicating meter by providing zero input voltage thereto under these circumstances. To this end, a zero offset circuit generally indicated by reference numeral 67 is provided which includes a potentiometer 67-1 having one end connected to the output of the divider circuit 32 and its opposite end connected to the negative terminal of a source of direct current potential 67-3. This assures that the output of the divider circuit 32 will always be a positive voltage proportional to $E1'/2E2'$. The potentiometer 67-1 has a wiper 67-1' which is adjusted to provide a zero output voltage thereat under no flow conditions. Thus, when the beam transmitted by the transmitting crystal 12 is deflected to the left by flow to the left so $E2'>E1'$, the ratio $E1'/2E2'$ will be smaller than under no flow conditions so that a smaller positive potential will appear at the output of the divider circuit 32. Under this circumstance, the potential on the wiper 67-1' will be a negative voltage whose magnitude is a measure of the fluid flow rate involved. When the beam is deflected to the right by flow to the right so $E2'<E1'$, the ratio $E1'/2E2'$ will be greater than under no flow condition so that a larger positive potential will appear at the output of the divider circuit 32. Then, the potential on the wiper 67-1' will be a positive voltage whose magnitude is a measure of the fluid flow rate involved.

The wiper 67-1' of the potentiometer is coupled to the input of the D.C. meter 11 which as previously indicated indicates the polarity and magnitude of the D.C. voltage fed thereto. If desired, the wiper 67-1' may also be connected to a suitable chopper circuit 68 and A.C. amplifier 70 which converts the direct current output on the wiper 67-1' to an A.C. potential whose amplitude is proportional to the fluid flow involved and whose phase indicates the direction of fluid flow.

The relative linearity and repeatability of results utilizing the present invention is illustrated in FIG. 5 which indicates the results of two test runs made thirty minutes apart, one of the test runs being indicated by circles and the other test run being indicated by crosses. The resultant curve drawn to these points shows that the output is nearly linear. Deviation from linearity was only about ±one percent (1%) and the repeatability is better than ±two percent (2%) of full scale.

Reference should now be made to FIGS. 7 and 7a which show exemplary circuit diagrams for the receiving channels 30-1 and 30-2. The gate circuits 54-1 and 54-2 of the receiver channels are identical so only one will be described in detail. (Corresponding elements of these circuits have be given identical reference characters except that a prime (') has been added to the reference numbers in circuit 54-2 as will be the case with other corresponding elements of the receiver circuits.) An NPN transistor 74 of circuit 54-1 is connected to various resistors and capacitors to form a more or less conventional emitter follower circuit including a potentiometer 78 connected between the emitter electrode thereof and ground. The adjustment of the wiper 79 of the potentiometer provides a gain control for the receiver channel involved. The output of the receiver crystal 16 is coupled through a capacitor 80 to the base electrode of the transistor 74. Another NPN transistor (all the transistors of the circuit to be described are NPN transistors) 76 controls the conduction of the transistor 74. To this end, a rectifier 82 is connected between the emitter electrode of the transistor 76 and the ungrounded end of the potentiometer 78. The base electrode of the transistor 76 is also connected to the output of the pulse generator 52 which, it will be recalled, produces a 30 micro-second pulse beginning at a time 40 micro-seconds after the start of each transmission cycle. In the circuit being described, this pulse is a negative pulse which renders the transistor 76 non-conductive. Normally, the transistor 76 conducts heavily and the resultant current flow through the rectifier 82 and the potentiometer 78 provides a back bias on the transistor 74 which prevents the same from conducting. The non-conductive condition of the transistor 74 prevents the one megacycle input signal fed to the base electrode from reaching the output thereof across the potentiometer. When the transistor 76 is in a relatively non-conductive condition upon the feeding of the negative gating pulse referred to, the transistor 74 can conduct to couple the input signal thereof from the receiving crystal 16 to the potentiometer 78.

The potentiometer wiper 79 is connected through a capacitor 83 to an inductor-capacitor network 84 which provides a high impedance at the one megacycle frequency involved, and this circuit, in turn, is connected to the input of the associated RF amplifier circuit 56-1. The output of the corresponding transistor 74 of gate circuit 54-2 is similarly coupled to its RF amplifier circuit 56-2.

The output of the RF amplifier circuit 56-1 is coupled through a capacitor 92 to a grounded clamping rectifier 94 forming part of the peak detector circuit 57-1. The clamping rectifier clamps the one megacycle signal from the RF amplifier circuit 56-1 to ground potential. The juncture point of the capacitor 92 and rectifier 94 is connected through a filter rectifier 96 arranged to pass only positive pulses to the base electrode of an NPN transistor 100. A biasing network for this transistor is formed by a pair of resistors 102 and 103, the former of said resistors being connected between a source of positive 25 volts D.C. and the input side of the rectifier 96, and the latter resistor being connected between the input side of the rectifier 96 and ground. A filter network 104 is connected between the collector electrode of the transistor 100 and the source of positive voltage to prevent coupling of the one megacycle signal into the power supply. A capacitor 106 is connected between the emitter electrode of the latter transistor and ground, the capacitor 106 charging to the peak of the one megacycle signal fed through the base to emitter circuit of the transistor 100. As previously indicated, this capacitor 106 is discharged during the occurrence of a one millisecond pulse generated by the pulse generator circuit 59.

As shown in FIG. 7, the pulse generator circuit 59 comprises a pair of NPN transistors 108 and 109 arranged to form a one-shot multivibrator circuit, and a transistor 111 coupled to the collector electrode of the transistor 109 to form an emitter follower circuit which provides a positive going one millisecond pulse at the emitter resistor 113 thereof. The eight millisecond delay pulse generator and differentiating circuit 58 is also shown in FIG. 7. This circuit includes a pair of transistors 114 and 116 arranged to form a one-shot multivibrator circuit substantially identical to that utilized in the circuit 59. A differentiating capacitor 118 is coupled to the collector electrode of the right hand transistor 116 and a clipping rectifier 120 is connected in series with the differentiating capacitor 118 to eliminate the positive pulses from the output of the one-shot multivibrator forming part of the circuit 58. The clipping rectifier 120 is coupled through a capacitor 122 to the base electrode of the right hand transistor 109 of the circuit 59 effectively to trigger the multivibrator.

As previously explained, the one millisecond output pulse from the emitter follower transistor 111 occurs 8 milliseconds after the beginning of each transmission cycle and this pulse is fed through a resistor-capacitor coupling network 124 to the base electrode of an NPN transistor 126 forming part of the peak detector circuit 57–1. The collector electrode of the transistor 126 is connected to the ungrounded end of the peak charging capacitor 106 and the emitter electrode thereof is connected through three series connected semi-conductor biasing rectifiers generally indicated by reference numeral 130. A rectifier 131 is connected between the base and the emitter electrodes of the transistor 126 to filter out any negative overshoot that might be present in the positive pulse fed to the latter base electrode from the pulse generator circuit 59. The presence of the latter positive pulse occurring for one millisecond at the time indicated will render the transistor 126 highly conductive to effect the discharge of the peak charging capacitor 106. The three rectifiers 130 act to establish a positive two volt potential at the collector electrode of the transistor 126 so that the capacitor 106 discharges on conduction of the transistor 126 to this voltage. After the termination of the one millisecond pulse referred to, the transistor 126 becomes non-conductive allowing the peak charging capacitor 106 to again charge to the peak voltage of the one megacycle signal at the input to the transistor 100.

The ungrounded side of the peak charging capacitor 106 is coupled through a rectifier 133 arranged to pass a positive voltage to the base electrode of an NPN transistor 135 forming an emitter follower circuit. A filter capacitor 137 is connected between the base electrode of the transistor 135 and ground. The so-called filter circuit 60–1 referred to in the box diagram of FIG. 5 actually includes in addition to the filter capacitor 137 two cascaded emitter follower circuits, one being formed by the aforementioned transistor 135 and an emitter resistor 138 connected between the emitter electrode of the latter transistor and ground, and the other including a transistor 140. A pair of semi-conductor rectifiers 142 are connected between the emitter electrode of the transistor 140 and an output resistor 144 connected to ground. The aforementioned output voltage E1′ which is a measure of the amplitude of the signal detected by the receiving crystal 16 is obtained from the ungrounded end of the output resistor 144. The divider circuit comprising the resistors 63 and 64 are connected in series between the emitter electrode of the transistor 140 and ground.

The bias-forming resistors 102 and 103 set the bias conditions for the transistors 100, 135 and 140 and they are selected so that the transistor 140 is in a barely conducting condition when the aforesaid one megacycle input signal to transistor 100 is absent.

The aforesaid one megacycle pulsation at the output of the RF amplifier circuit 56–2 is also fed through a capacitor 92′ to a clamping rectifier 94′ forming part of the peak detector circuit 57–2. They respectively perform the same functions as the capacitor 92 and rectifier 94 previously described in connection with the peak detector circuit 57–1. The peak detector circuit 57–2 further includes NPN transistors 100′ and 126′ connected to form circuits which are similar to the circuits previously described in which transistors 100 and 126 are located. The other elements in the circuit 57–2 which correspond to the elements in circuit 57–1 have been similarly numbered except that a prime has been added after the reference numerals. One difference in the peak detector circuit 57–2 is that the rectifiers 130 are absent in the emitter circuit of the transistor 126′ so that the peak charging capacitor 106′ discharges to above one-half volt rather than two volts because of the difference in the load conditions of the transistor 100′. Also, a rectifier 150 and a capacitor 152 are connected in parallel with the peak charging capacitor 106′ of the peak detector circuit 57–2, which rectifier and capacitor are absent in the peak detector circuit 57–1. The same one millisecond pulse at the output of the circuit 59 is fed to the base electrode of the transistor 126′ to effect discharge of the peak charging capacitor 106′. Before discharge, the capacitor 106′ charges to the peak (E2′) of the one megacycle signal fed to the base electrode of the transistor 100′.

The main elements of the subtracting circuit 61–2 which provides a measure of the difference between $E2' - \frac{1}{2}E1'$ as above explained is rectifier 150 connected to the ungrounded end of the resistor 64 (across which the voltage $\frac{1}{2}E1'$ is present) and rectifier 152 connected to the ungrounded end of the peak charging capacitor 106′. The cathode ends of these rectifiers are connected to a common point 154. As previously indicated, the voltage E2′ will always be substantially greater than the voltage $\frac{1}{2}E1'$ over the range of flow rates for which the apparatus is designed. Therefore, prior to discharge of peak charging capacitor 106′, the positive voltage E2′ applied to the anode electrode of the rectifier 152 will always be greater than the positive voltage $\frac{1}{2}E1'$ applied to the anode electrode of the rectifier 150. For approximately 8 milliseconds, the voltage at the common point 154 will, therefore, be the voltage across the peak charging capacitor 106′. When the capacitor 106′ is discharged during the one millisecond interval referred to, the voltage across the resistor 64 (which is a continuous D.C. voltage due to the action of the filter capacitor 137) will then appear at the common point 154. FIG. 8(a) illustrates the waveform of the voltage at the common point 154 for a number of transmission cycles.

The latter voltage, FIG. 8(a), is fed to the base electrode of an NPN transistor 155 which forms an amplifier stage whose output taken at the collector electrode thereof is fed through a capacitor 160 to the base electrode of another NPN transistor 162. The transistors 155 and 162 together with the associated circuit elements form an amplifier circuit having an overall gain of 2. A resistor 164 connected to the emitter electrode of the transistor 162 is adjustable to control the gain of the associated amplifier stage to provide the desired overall gain of 2. The outputs of the amplifier stage in which the transistor 162 is a part is taken at the collector electrode thereof, and the potential thereat is a measure of the quantity $2E2' - E1'$. This potential is coupled through a capacitor 167 to a clamping rectifier 170 in series with a resistor 172 which effectively clamps the amplified square waveform of FIG. 8(a) to ground as indicated by the waveform of FIG. 8(b). The D.C. amplitude of the resulting waveform is obviously $2E2' - E1'$. The voltage so clamped is fed through a capacitor 173 to a filter capacitor 175 which provides a direct current potential which is the average of the clamped waveform shown in FIG. 8(b). The latter capacitor is coupled to the input of a transistor emitter follower circuit including an NPN transistor 178. An output resistor 180 is connected between the emitter electrode of the transistor 170 and ground, and a rectifier 182 and a resistor 184 are connected in series across the resistor 180. The output of the emitter follower stage in which the transistor 178 is a part is taken across the resistor 184 and this output is fed to one of the inputs of the divider circuit 32. (The Kleinberg divider circuit includes a blocking oscillator which may feed back an undesired pulse which is blocked by the rectifier 182 in the output circuit of the emitter follower including the transistor 178.)

It should be understood that numerous modifications may be made of the most preferred forms of the invention described above without deviating from the broader aspects of the invention.

What I claim as new and desire to protect by Letters Patent of the United States is:

1. In combination with a conduit through which a fluid is to be passed, an ultrasonic flowmeter of the beam deflection type for measuring fluid flow in said conduit comprising: ultrasonic transmitting transducer means mounted on said conduit for transmitting time spaced ultrasonic beam pulsations substantially transversely across the conduit containing the fluid to be measured, wherein echo pulsations rebound back and forth across the conduit walls and strike the same general area of the conduit as the directly received pulsation, receiving transducer means mounted on said conduit for intercepting the initial and at least some of the echo pulsations and wherein different portions of the ultrasonic beam passing through the fluid in said conduit are intercepted thereby with a varying fluid velocity to provide in the output of the receiving transducer means a variation in signal amplitude with variation in the flow rate of the fluid in the conduit, receiver circuit means coupled to said receiving transducer means, gating means associated with said receiver circuit means for rendering the receiver circuit means receptive to the ouput of said receiver transducer means only for a relatively short interval between the transmission of successive ultrasonic pulsations during which interval an ultrasonic pulsation is intercepted by said receiving transducer means and the other intercepted pulsations do not occur, and means responsive to the said receiver circuit means for indicating the fluid flow rate in the said conduit.

2. In combination with a conduit through which a fluid is to be passed, an ultrasonic flowmeter of the beam deflection type for measuring fluid flow in said conduit comprising: ultrasonic transmitting transducer means mounted on said conduit for transmitting an ultrasonic beam across the conduit containing the fluid to be measured substantially at right angles to the longitudinal axis of the conduit, wherein echo pulsations rebound back and forth across the conduit walls and strike the same general area of the conduit as the directly received pulsation, means for energizing said transmitting transducer means intermittently wherein ultrasonic beam pulsations are transmitted thereby, receiving transducer means mounted on said conduit for intercepting the initial and at least some of the echo pulsations and wherein different portions of the ultrasonic beam passing through the fluid in said conduit are intercepted thereby with a varying fluid velocity to provide in the output of the receiving transducer means a variation in signal amplitude with variation in the flow rate of the fluid in the conduit, said receiving transducer means being positioned relatively close to said transmitting transducer means to that the receiving transducer means receives, in addition to the initial beam pulsation, echo pulsations rebounding from the conduit walls, the pulse repetition rate of the ultrasonic pulsations generated by said transmitting transducer means being such that the echo pulsations from a given transmitted pulse substantially disappear before the transmission of the next pulsation, receiver circuit means coupled to said receiving transducer means, gating means associated with said receiver circuit means for rendering the receiver circuit means receptive to the output of said receiving transducer means only for a relatively short interval between the transmission of successive ultrasonic pulsations during which interval an ultrasonic pulsation is intercepted by said receiving transducer means and the other intercepted pulsations do not occur, and means responsive to said receiver circuit means for indicating the fluid flow rate in said conduit.

3. In combination with a conduit through which a fluid is to be passed, an ultrasonic flowmeter of the beam deflection type for measuring fluid flow in said conduit comprising: ultrasonic transmitting transducer means mounted on said conduit for transmitting an ultrasonic beam across the conduit containing the fluid to be measured substantially at right angles to the longitudinal axis of the conduit, wherein echo pulsations rebound back and forth across the conduit walls and the strike the same general area of the conduit as the directly received pulsation, means for energizing said transmitting transducer means intermittently wherein ultrasonic beam pulsations are transmitted thereby, receiving transducer means mounted on said conduit for intercepting the initial and at least some of the echo pulsations and wherein different portions of the ultrasonic beam passing through the fluid in said conduit are intercepted thereby with a varying fluid velocity to provide in the output of the receiving transducer means a variation in signal amplitude with variation in the flow rate of the fluid in the conduit, said receiving transducer means being positioned relatively close to said transmitting transducer means to that the receiving transducer means receives, in addition to the initial beam pulsation, echo pulsations rebounding from the conduit walls, the pulse repetition rate of the ultrasonic pulsations generated by said transmitting transducer means being such that the echo pulsations from a given transmitted pulse substantially disappear before the transmission of the next pulsation, receiver circuit means coupled to said receiving transducer means, gating means associated with said receiver circuit means for rendering the receiver circuit means receptive to the output of said receiving transducer means only for a relatively short interval between the transmission of successive ultrasonic pulsations during which interval only the first of the ultrasonic pulsations are intercepted by said receiving transducer means and the other intercepted pulsations do not occur, and means responsive to said receiver circuit means for indicating the fluid flow rate in said conduit.

4. In combination with a conduit through which a fluid is to be passed, an ultrasonic flowmeter of the beam deflection type for measuring fluid flow in said conduit comprising: ultrasonic transmitting transducer means mounted on said conduit for transmitting an ultrasonic beam across the conduit containing the fluid to be measured substantially at right angles to the longitudinal axis of the conduit, wherein echo pulsations rebound back and forth across the conduit walls and strike the same general area of the conduit as the directly received pulsation, means for energizing said transmitting transducer means intermittently wherein ultrasonic beam pulsations are transmitted thereby, receiving transducer means mounted on said conduits for intercepting the initial and at least some of the echo pulsations and wherein different portions of the ultrasonic beam passing through the fluid in said conduit are intercepted thereby with a varying fluid velocity to provide in the output of the receiving transducer means a variation in the signal amplitude detected thereby with variation in the flow rate of the fluid in the conduit, said receiving transducer means being positioned relatively close to said transmitting transducer means so that the receiving transducer means receives, in addition to the initial beam pulsation, echo pulsations rebounding from the conduit walls, the pulse repetition rate of the ultrasonic pulsations generated by said transmitting transducer means being such that the echo pulsations from a given transmitted pulse substantially disappear before the transmission of the next pulsation, receiver circuit means coupled to said receiving transducer means, gating means associated with said receiver circuit means for rendering the receiver circuit means receptive to only one and the same ultrasonic pulsation each transmission cycle and the other intercepted pulsations do not occur, and means responsive to said receiver circuit means for indicating the fluid flow rate in said circuit.

5. In combination with a conduit through which a fluid is to be passed, an ultrasonic flowmeter of the beam deflection type for measuring fluid flow in said conduit comprising: ultrasonic transmitting transducer means mounted on said conduit for transmitting an ultrasonic beam across the conduit containing the fluid to be measured substantially at right angles to the longitudinal axis of the conduit, wherein echo pulsations rebound back and forth across the conduit walls and strike the same general area of the conduit as the directly received pulsation, means for energizing said transmitting transducer means intermittently wherein ultrasonic beam pulsations are transmitted thereby, receiving transducer means mounted on said conduit for intercepting the initial and at least some of the echo pulsations and wherein different portions of the ultrasonic beam passing through the fluid in said conduit are intercepted thereby with a fluid velocity to provide in the output of the receiving transducer means a variation in signal amplitude with variation in the flow rate of the fluid in the conduit, said receiving transducer means being positioned relatively close to said transmitting transducer means so that the receiving transducer means receives, in addition to the initial beam pulsation, echo pulsations rebounding from the conduit walls, the pulse repetition rate of the ultrasonic pulsations generated by said transmitting transducer means being such that the echo pulsations from a given transmitted pulse substantially disappear before the transmission of the next pulsation, receiver circuit means coupled to said receiving transducer means, gating means associated with said receiver circuit means for rendering said receiver circuit means insensitive to most of the echo pulsations and means responsive to said receiver circuit means for indicating the fluid flow rate in said conduit.

6. In combination with a conduit through which a fluid is to be passed, an ultrasonic flowmeter of the beam deflection type for measuring fluid flow in said conduit comprising: ultrasonic transmitting transducer means mounted on said conduit for transmitting an ultrasonic beam across the conduit containing the fluid to be measured substantially at right angles to the longitudinal axis of the conduit, wherein echo pulsations rebound back and forth across the conduit walls and strike the same general area of the conduit as the directly received pulsation, said ultrasonic beam having a symmetrical shape with oppositely sloping response drop-off portions on opposite sides of a maximum response point, means for energizing said transmitting transducer means intermittently wherein ultrasonic beam pulsations are transmitted thereby, a pair of receiving transducer means mounted on said conduit for intercepting the initial and at least some of the echo pulsations and wherein respectively said oppositely sloping response drop-off portions of the ultrasonic beam passing through the fluid in said conduit are intercepted thereby with a varying fluid velocity to provide in the output of the receiving transducer means a variation in signal amplitude with variations in the flow rate of the fluid in the conduit, said receiving transducer means being positioned relatively close to said transmitting transducer means so that the receiving transducer means receives, in addition to the initial beam pulsation, echo pulsations rebounding from the conduit walls, the pulse repetition rate of the ultrasonic pulsations generated by said transmitting transducer means being such that the echo pulsations from a given transmitted pulse substantially disappear before the transmission of the next pulsation, receiver circuit means coupled to said receiving transducer means, gating means associated with said receiver circuit means for rendering said receiver circuit means insensitive to all but the first received echo pulsation, and means responsive to said receiver circuit means for indicating the fluid flow rate in said conduit.

References Cited by the Examiner

UNITED STATES PATENTS

| | | | |
|---|---|---|---|
| 2,514,235 | 7/50 | Genin et al. | 73—194 X |
| 2,627,543 | 2/53 | Obermaier | 73—194 |
| 2,768,524 | 10/56 | Beard | 73—53 |
| 2,874,568 | 2/59 | Petermann | 73—194 |
| 2,923,155 | 2/60 | Welkowitz | 73—194 |
| 3,006,184 | 10/61 | Goldman | 73—67.8 |
| 3,011,339 | 12/61 | Furon | 73—67.9 |

RICHARD C. QUEISSER, Primary Examiner.

ROBERT L. EVANS, Examiner.